(12) United States Patent
Mukherjee et al.

(10) Patent No.: US 12,743,320 B2
(45) Date of Patent: Sep. 22, 2026

(54) DELIVERING APPLICATIONS VIA AN ON-DEMAND VIRTUAL MACHINE SYSTEM BASED ON CUSTOM PACKAGE REPOSITORY

(71) Applicant: Schlumberger Technology Corporation, Sugar Land, TX (US)

(72) Inventors: Ankur Mukherjee, Pune (IN); Vijay Kumar, Pune (IN); Rudi Olufsen, Lysaker (NO); Endri Hysenaj, Lysaker (NO); Haakon Zahl, Lysaker (NO); Truls Arnegaard, Lysaker (NO); Jagdish Idhate, Pune (IN); Morten Brun, Lysaker (NO); Alessandro Bottoni, Montpellier (FR); Bjorn Nordmoen, Lysaker (NO); David Parker, Tananger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 432 days.

(21) Appl. No.: 18/258,308

(22) PCT Filed: Dec. 20, 2021

(86) PCT No.: PCT/US2021/064304
§ 371 (c)(1),
(2) Date: Jun. 19, 2023

(87) PCT Pub. No.: WO2022/140233
PCT Pub. Date: Jun. 30, 2022

(65) Prior Publication Data

US 2024/0054022 A1 Feb. 15, 2024

(30) Foreign Application Priority Data

Dec. 23, 2020 (IN) ............................ 202031056152

(51) Int. Cl.
*G06F 9/50* (2006.01)
*G06F 9/455* (2018.01)

(52) U.S. Cl.
CPC ........ *G06F 9/5077* (2013.01); *G06F 9/45533* (2013.01); *G06F 9/5022* (2013.01);
(Continued)

(58) Field of Classification Search
None
See application file for complete search history.

(56) References Cited

U.S. PATENT DOCUMENTS 9,571,561 B2 2/2017 Jang
11,256,574 B1 * 2/2022 Reddy ................ G06F 11/1461
(Continued)

OTHER PUBLICATIONS

Search Report and Written Opinion of International Patent Application No. PCT/US2021/064304 dated Mar. 22, 2022, 9 Pages.
(Continued)

*Primary Examiner* — Zujia Xu
(74) *Attorney, Agent, or Firm* — Kyle R. Miiller

(57) ABSTRACT

Methods, computing systems, and computer-readable media for delivering applications using an on-demand virtual machine system. The method includes receiving an application request from a user, including a request to remotely access one or more applications; determining computing resources for fulfilling the application request; allocating the determined computing resources to the user from a client resource pool of a client to which the user is associated, wherein the allocating comprises serving a virtual machine (VM) allocated with the determined computing resources to the user; determining that the computing resources are no longer in use; and releasing the computing resources to the client resource pool.

20 Claims, 7 Drawing Sheets

(52) U.S. Cl.
CPC ............ *G06F 9/5027* (2013.01); *G06F 9/505* (2013.01); *G06F 2209/5011* (2013.01)

(56) References Cited

U.S. PATENT DOCUMENTS

| | | | | |
|---|---|---|---|---|
| 2007/0289740 | A1 | 12/2007 | Thigpen | |
| 2010/0300684 | A1 | 12/2010 | Kotsonis | |
| 2011/0145392 | A1 | 6/2011 | Dawson et al. | |
| 2012/0089980 | A1 | 4/2012 | Sharp et al. | |
| 2012/0166967 | A1 | 6/2012 | Deimbacher et al. | |
| 2013/0227699 | A1 | 8/2013 | Barak et al. | |
| 2013/0232485 | A1* | 9/2013 | Murray | G06Q 30/0633 718/1 |
| 2015/0347194 | A1* | 12/2015 | Che | G06F 9/45558 718/1 |
| 2015/0378921 | A1* | 12/2015 | Karippara | G06F 9/45533 710/308 |
| 2017/0024256 | A1* | 1/2017 | Mukherjee | G06F 9/5005 |

OTHER PUBLICATIONS

Extended Search Report issued in European Patent Application No. 21911960.9 dated Nov. 26, 2024, 8 pages.

Kuhn, D., "System and method to create profile-aware virtual machine pool in cloud environment", IP.com, IP.Com, Inc., West Henrietta, NY, US, 2013, 13 pages.

* cited by examiner

DELIVERING APPLICATIONS VIA AN ON-DEMAND VIRTUAL MACHINE SYSTEM BASED ON CUSTOM PACKAGE REPOSITORY

CROSS-REFERENCE TO RELATED APPLICATIONS

The present application is a National Stage Entry of International Application No. PCT/US2021/064304, filed Dec. 20, 2021, which claims priority benefit of Patent Application No. 202031056152 in India, filed Dec. 23, 2020, the entirety of which is incorporated by reference herein and should be considered part of this specification.

BACKGROUND

Exploration and Production (E&P) software suites (e.g., petrotechnical suites) are used in the oilfield to collect and analyze a variety of technical data. This data may be used for a variety of petrotechnical applications and projects relating to, for example, locating, planning, drilling, and/or producing hydrocarbons from a well. Such E&P platforms may be collaborative, providing an environment in which teams of experts in different locations and/or different disciplines can work together to improve project success.

A cloud-based application includes a computer application that is remotely accessible through a network (e.g., the Internet, a Wide Area Network, etc.). These applications may be accessible and usable through an application or web page via a user's client device in which user inputs related to using the cloud-based application are received by a host device through the network. The host device processes the user inputs and transmits output data back to the user's client device as part of using the cloud-based application. For performance reasons, petrotechnical suite applications may be non-cloud native and instead may be accessed through a cloud-based virtual system that runs hosts petrotechnical suite applications within a virtual machine.

In computing, a virtual machine (VM) is a software system that emulates the characteristics of a physical computer system. VMs are based on computer architectures and provide functionality of a physical computer. VM implementations may involve specialized hardware, software, or a combination. For example, a VM software application (e.g., a hypervisor) may run a virtual machine from a system image that includes software data from which a VM may be built (e.g., operating system, applications, etc.). The hypervisor may be an application that a host machine uses to run a VM on the host machine. The hypervisor may manage the physical computing resources from the host machine that may be allocated to the VM machine. One example use of VMs is to provide multiple remote sessions to different users in which different users are provided with different dedicated VMs. In this way, one physical host computer may host multiple VMs to which different users may remotely access using individual client computer devices. The VMs may host any variety of user applications.

SUMMARY

Embodiments of the disclosure may provide a method for delivering applications using an on-demand virtual machine system. The method may include receiving an application request from a user, including a request to remotely access one or more applications; determining computing resources for fulfilling the application request; allocating the determined computing resources to the user from a client resource pool of a client to which the user is associated, the allocating comprises serving a virtual machine (VM) allocated with the determined computing resources to the user; delivering the requested applications to the user via the VM; determining that the computing resources are no longer in use; and releasing the computing resources to the client resource pool.

Embodiments of the disclosure may also provide a computing system, including one or more processors; and a memory system comprising one or more non-transitory computer-readable media storing instructions that, when executed by at least one of the one or more processors, cause the computing system to perform operations. The operations may include receiving an application request from a user, including a request to remotely access one or more applications; determining computing resources for fulfilling the application request; allocating the determined computing resources to the user from a client resource pool of a client to which the user is associated, the allocating comprises serving a virtual machine (VM) allocated with the determined computing resources to the user; delivering the requested applications to the user via the VM; determining that the computing resources are no longer in use; and releasing the computing resources to the client resource pool.

Embodiments of the disclosure may further provide a non-transitory computer-readable medium storing instructions that, when executed by one or more processors of a computing system, cause the computing system to perform operations. The operations may include receiving an application request from a user, including a request to remotely access one or more applications; determining computing resources for fulfilling the application request; allocating the determined computing resources to the user from a client resource pool of a client to which the user is associated, the allocating comprises serving a virtual machine (VM) allocated with the determined computing resources to the user; delivering the requested applications to the user via the VM; determining that the computing resources are no longer in use; and releasing the computing resources to the client resource pool.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
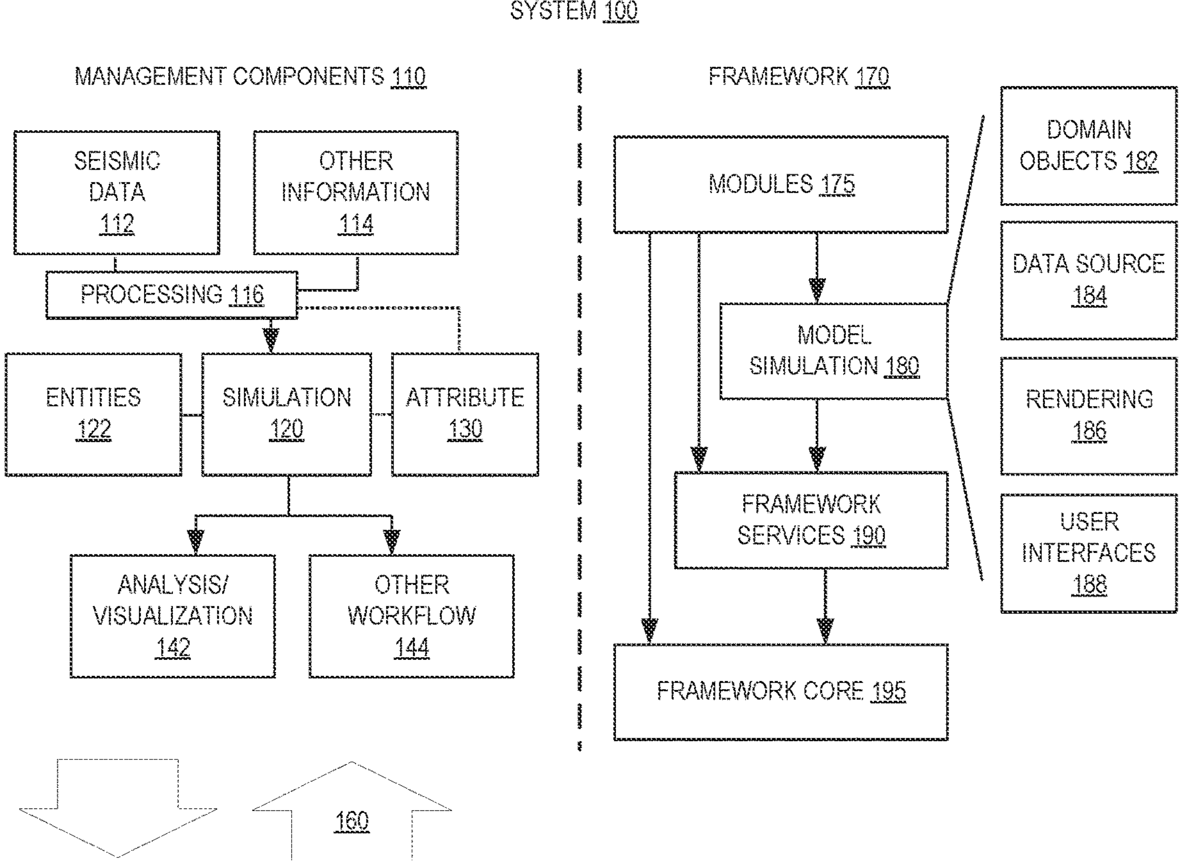
FIG. 1 illustrates an example of a system that includes various management components to manage various aspects of a geologic environment, according to an embodiment.
Figure 1:
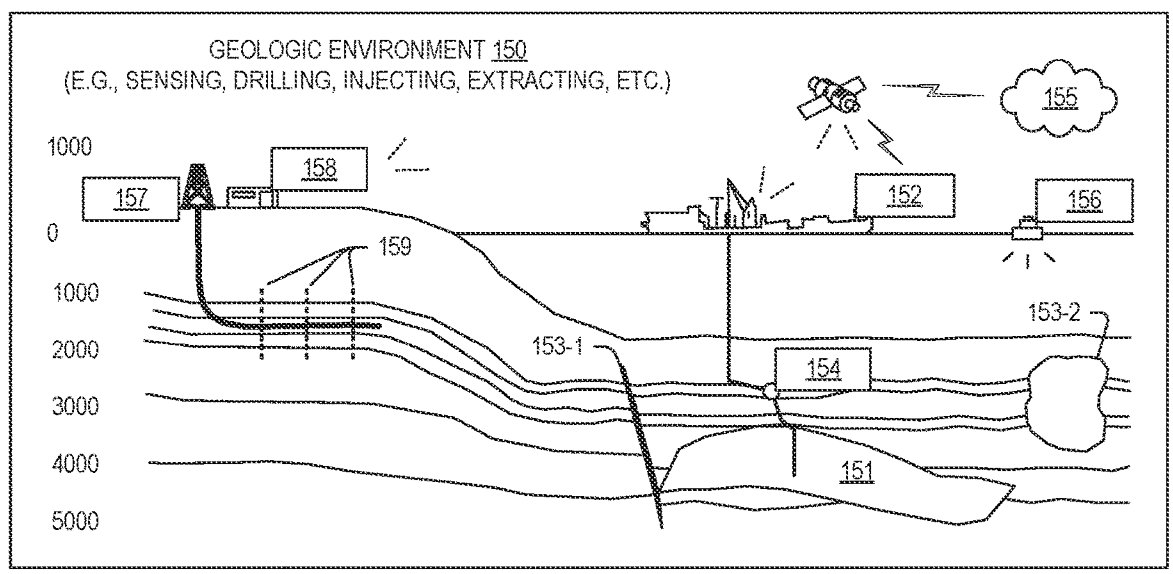

For performance or other reasons, petrotechnical suite applications may be non-cloud native. To access a petrotechnical suite application remotely (or other type of non-cloud native application), existing systems may provide a user with a virtual machine (VM) environment that hosts the application. The VM may be accessed remotely through a cloud system via a client computing device, thereby providing the user with remote access to the application even when the application itself is a non-native cloud application. However, such systems may consume an inordinate level of resources and are difficult to update and maintain, particularly in an enterprise environment with hundreds or more users. For example, existing systems may build a VM using a "golden image" (e.g., a system image) that includes a set of applications for the user in which individual golden images may require extensive logistical efforts to maintain. Further, the resources allocated to the VMs may be fixed and the VMs may run for an extended period of time (even when not in use by the users), thereby consuming excess computing resources.

Accordingly, aspects of the present disclosure may include a system and/or method that may provide users with remote access to petrotechnical suite applications (and/or other types of applications that do not run natively in the cloud) using an on-demand virtual machine system. More specifically, aspects of the present disclosure may deliver different VMs to users in which the resources allocated to the VMs are dynamic based on a prediction of the users' needs at a given time. Further, the VM resource allocation may be based on user and/or company/client profile information identifying user needs. Additionally, or alternatively, VM activity may be monitored in a manner such that VMs that are not in use may be shut down or suspended, freeing up computing resources. In this way, computing resources are more efficiently allocated in relation to existing systems that inefficiently consume resources that may not be needed or in use.

In some embodiments, aspects of the present disclosure may provide on-demand application delivery in which user requested applications may be provided on a VM. More specifically, instead of VMs being built from golden images, VMs may be "bare bones" including an operating system, security software, and/or other minimal software in which the resources dedicated to that VM may be based on the demands of the requested applications, user/client profile information, service level agreements (SLA), etc. The requested applications may then be delivered on-demand to the user via the VM. In this way, the resources consumed by the VM are tailored specific to the user's needs at a given time, thereby preventing a situation in which an over-powered or over-consuming VM is provided.

In some embodiments, aspects of the present disclosure may also provide a unified or centralized application repository service in which different clients (e.g., organizations, companies, etc.) may publish applications. Application versions may also be centrally updated and maintained. In this way, the user may request the most up-to-date version of applications (or prior versions, if desired), without the need to manage multiple golden images for different users or groups.

In some embodiments, aspects of the present disclosure may provide an architecture to more efficiently deliver a customized application suite to a client. For example, aspects of the present disclosure may provide customizable application package repositories for individual clients. In some embodiments, a particular client may select applications from a global repository having applications available to any client, as well as third party packages (e.g., applications and/or plug-ins) available only to the particular client. A client-specific application repository may be maintained in which the client-specific application repository may include the third party packages and metadata used to access applications stored by the global repository. A VM pool may be generated for the client based on the client-specific application repository in which the VM pool may include VMs having different resource allocations for supporting different applications with different resource demands. As described herein, a VM with a sufficient resource allocation, but not an excess resource allocation, may be served to a user based on the user's requested application at a given time. Thus, if low-resource applications are requested by the user, these applications may be instantiated on a cheaper VM (e.g., lower resource-consuming VM with lower resource allocation), and this VM may be served to the user. Similarly, a VM with a higher resource allocation may be served when the user requests more resource-demanding applications. In this way, computing resources are conserved without affecting user experience.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN framework. As an example, a workflow may include one or more worksteps that access a module such as a plug-in (e.g., external executable code, etc.).

Figure 2:
FIG. 2 illustrates an example on-demand cloud application delivery environment in accordance with aspects of the present disclosure.
Figure 2:
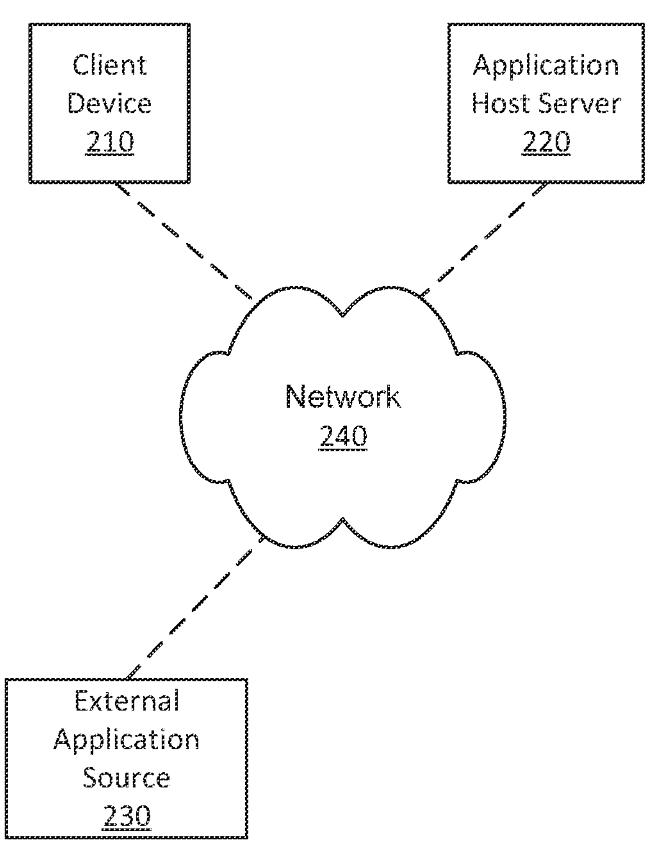

FIG. 2 illustrates an example on-demand cloud application delivery environment in accordance with aspects of the present disclosure. As shown in FIG. 2, environment 200 includes a client device 210, an application host server 220, an external application source 230, and a network 240.

The client device 210 may include a computing device capable of communicating via a network, such as the network 240. In example embodiments, the client device 210 corresponds to a portable computer device (e.g., a laptop or a tablet computer), a desktop computer, a server device, and/or another type of computing device. In some embodiments, the client device 210 may be used to access an application via the application host server 220 (e.g., through a VM hosted by the application host server 220).

The application host server 220 may include one or more computing devices that hosts VMs hosting an application suite (e.g., a petrotechnical application suite). As described herein, the application host server 220 may dynamically update a computer resource allocation pool for a client based on client usage activity (e.g., usage activity of users associated with the client), service level agreements (SLAs) with the client, etc. Further, the application host server 220 may receive a user request to access an application, and in response to the request, the application host server 220 may provide a VM in which the VM is generated on-demand and is dynamically allocated with different levels of resources based on user need and user profile information relating to user historical usage activity, user roles, etc. In some embodiments, the application host server 220 may monitor user activity and suspend a user's session based on user inactivity, thereby freeing up computing resources. When the user later requests access to the application, resources may be re-allocated, and the user's session may be restored. In some embodiments, the application host server 220 may maintain a global application repository (e.g., a repository of applications available to all clients) and a client-specific application repository (e.g., a repository of client-specific applications/plug-ins and metadata identifying global applications to which the client may access).

The external application source 230 may include one or more computing devices that hosts third party packages (e.g., applications, plug-ins, etc.) that a client may access. In some embodiments, the third party packages may include private packages produced by a particular client for use by the particular client. Additionally, or alternatively, the third party packages may be public packages developed by a third party developer and generally available to any client.

The network 240 may include network nodes and one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 240 may include copper transmission cables, optical transmission fibers, wireless transmission, routers, firewalls, switches, gateway computers and/or edge servers.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3:
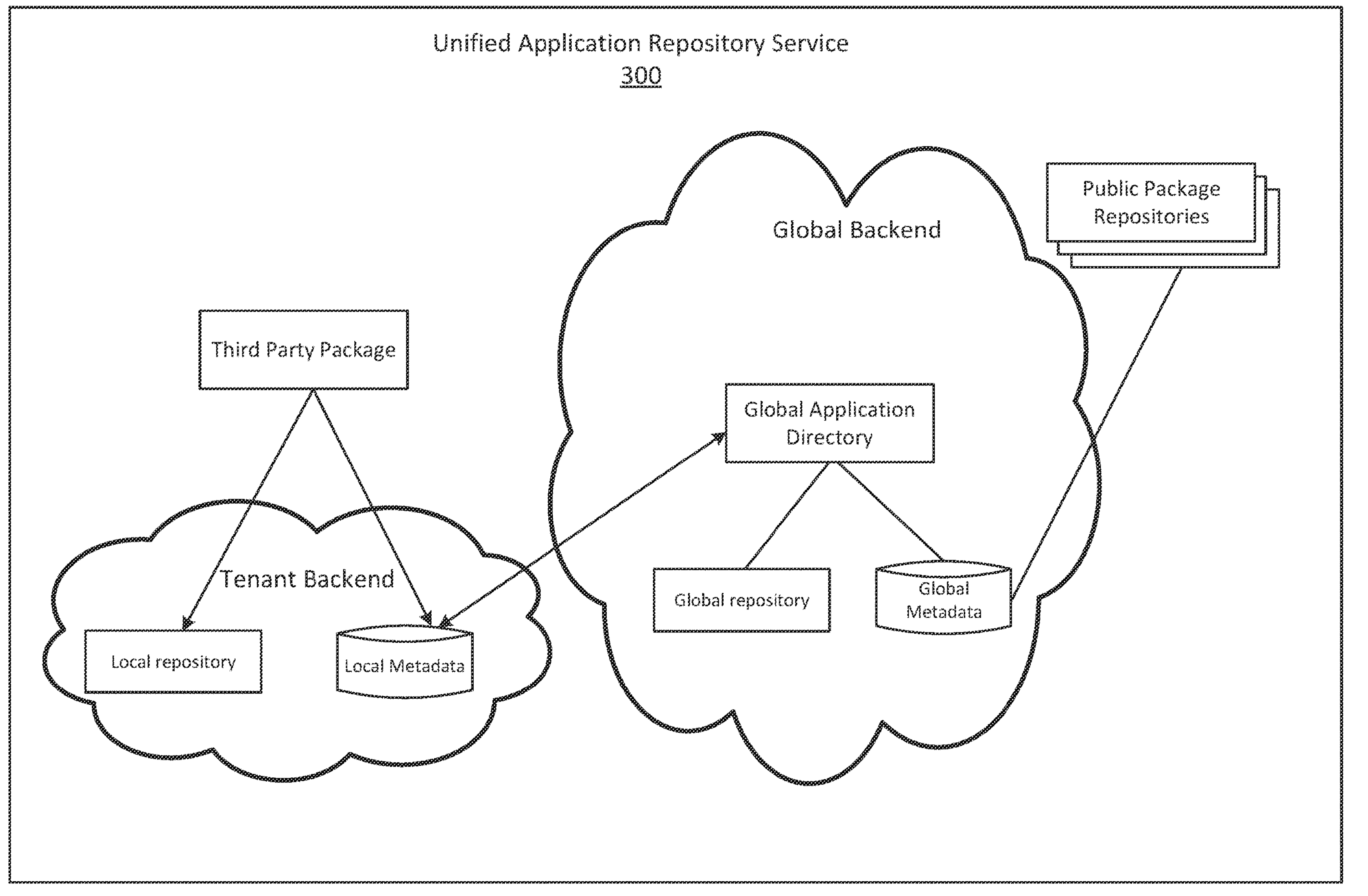
FIG. 3 illustrates an example architecture of a unified application repository service that may be used to generate a custom package repository for a particular client.

FIG. 3 illustrates an example architecture of a unified application repository service 300 that may be used to generate a custom package repository for a particular client. As shown in FIG. 3, the unified application repository service 300 may include backend components including a global backend and a tenant or client-specific backend counterpart. The unified application repository service 300 backend (e.g., the global backend) maintain a directory of global applications available to all clients. Further, the global backend may handle the storage for the globally available applications (e.g., applications and plugins) in the global repository, while the tenant-specific backend may handle the storage for the third party applications or plugins available only to that client in the local repository. The tenant backend and the global backend may include metadata repositories to store metadata related to an application (tags indicating application access permissions, type of build, development progress, version number, etc.). For example, the local metadata for the tenant backend may store the metadata for private third party applications available to the tenant/client.

As described herein, for a particular client, the global application directory may list applications that are available to the particular client, including private third party applications in the local repository, the applications in the global repository, and public third party applications that may be stored in public package repositories. More specifically, the global application directory may list the available applications based on information from the local metadata repository, the global repository, and the global metadata repository. For example, the global application directory may query the local metadata repository to the private third party applications available in the local repository (e.g., such that the global application directory may list the third party application as an available application for the particular client). The global metadata repository may store metadata information linked to public third party application packages. In this way, the global application directory may list the applications stored in the global repository, the local repository, and the public package repositories. In some embodiments, the unified application repository service 300 and associated components may provide high availability (load balancing, fail-over, live upgrade etc.), monitoring (e.g., telemetry, logging, alerting, incidents, self-healing, etc.) and/or backup & recovery.

Figure 4:
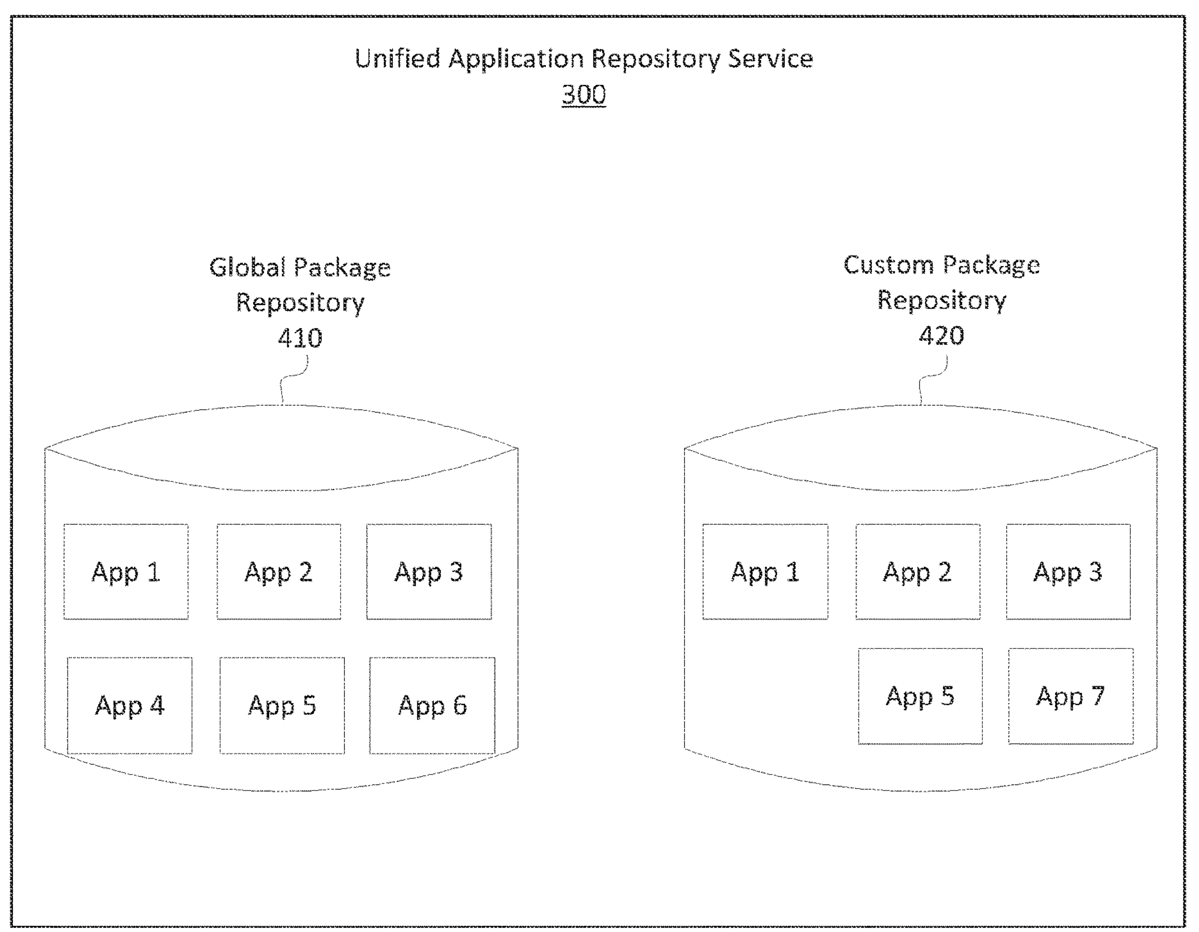
FIG. 4 illustrates an example unified application repository service in accordance with the aspects of the present disclosure.

FIG. 4 illustrates an example unified application repository service in accordance with the aspects of the present disclosure. As shown in FIG. 4, the unified application repository service 300 may include a central or global package repository 410 that serves multiple tenant and clients which may reside in a shared tenant. In some embodiments, the custom package repository 420 may include one or more applications available in the global package repository 410, and additional custom and/or third-party applications not available to other clients in the global package repository 410.

In some embodiments, the application host server 220 may generate a VM pool for a client in which the VM pool includes VMs with different levels of resource allocations to support different applications in which the VM pool may be based on the client's custom package repository 420 and the resource demands of the applications in the custom package repository 420.

For example, one VM in the VM pool may be allocated with relatively fewer resources to host applications with relatively lower resource demands, and another VM in the VM pool may be allocated with relatively greater resources to host applications with relatively higher resource demands. As described herein, VMs from the VM pool may be served to users based on the users requested applications at a given time, and VMs may be "returned" to the VM pool (e.g., released or un-allocated) when the user is no longer using the applications hosted by the VM. Further, a client's VM pool itself and/or the VMs that are in operation at a given time may be dynamic based on the client's peak and off-peak times.

Figure 5:
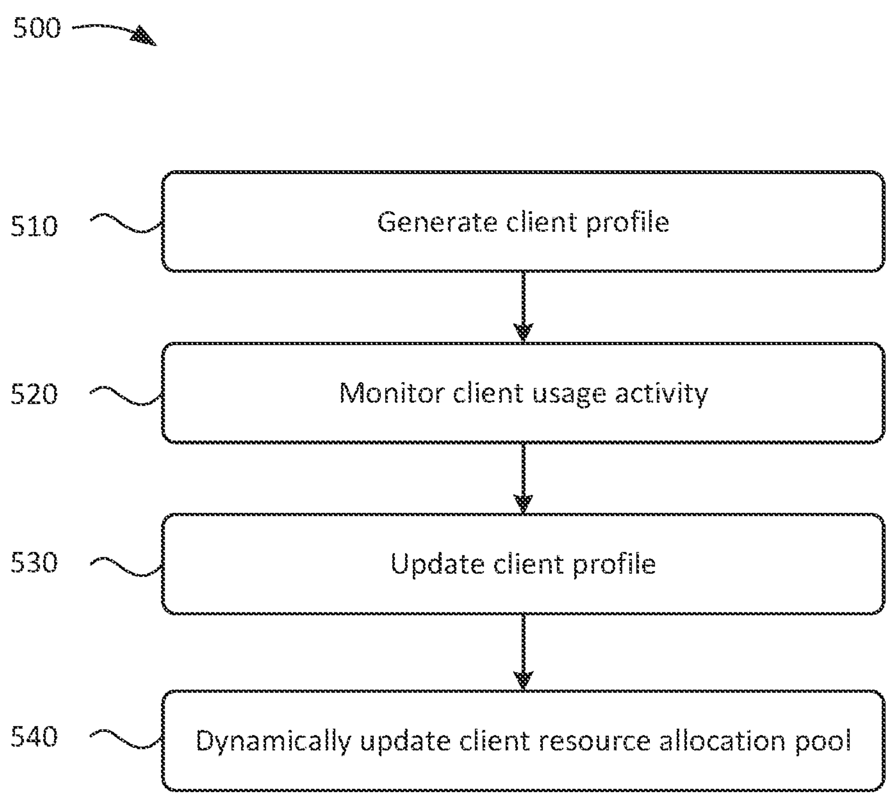
FIG. 5 illustrates an example flowchart of a process for dynamically updating a client's resource allocation pool used to provide VMs to the client's users.

FIG. 5 illustrates an example flowchart of a process for dynamically updating a client's resource allocation pool used to provide VMs to the client's users. More specifically, the process 500 may dynamically update a client's pool of VMs that are available to the client at a given time. The blocks of FIG. 5 may be implemented in the environment of FIG. 2, for example, and are described using reference numbers of elements depicted in FIG. 2. As noted herein, the flowchart illustrates the architecture, functionality, and operation of possible implementations of systems, methods, and computer program products according to various embodiments of the present disclosure.

As shown in FIG. 5, the process 500 may include generating a client profile (as at block 510). For example, the application host server 220 may generate a profile for a client based on information relating to an SLA, a client type, applications the client may use (e.g., based on the client's custom package repository 420), number of users associated with the client, etc. In some embodiments, the client profile may be stored by the application host server 220 and a resource pool may be generated for the client. As described herein, VMs may be generated to deliver applications to the client's users in which resources for the VMs are dynamically provided (as described in greater detail herein with respect to FIG. 6).

The process 500 also may include monitoring the client's usage activity (as at block 520). For example, the application host server 220 may monitor the usage activity of users associated with the client. The usage activity may identify the computing resources used by the users (e.g., the computing resources allocated to the VMs used by the users). In some embodiments, the usage activity may be an average usage over different time periods (e.g., peak time periods, off-peak time periods, etc.).

The process 500 further may include updating the client profile (as at block 530). For example, the application host server 220 may update the client profile identifying the client's use activity at different time periods. In this way, the client profile may identify the client's computing resource needs at different time periods based on historical usage data.

The process 500 also may include dynamically updating the client's resource allocation pool (as at block 540). For example, the application host server 220 may dynamically update the client's resource allocation pool (e.g., VM pool) based on the client's profile and historical usage data. More specifically, the application host server 220 may dynamically increase or reduce the client's resource pool based on client usage activity or client usage history at different time periods. In this way, computing resources may be conserved (e.g., at off-peak times) while maintaining a reserve resource pool size in accordance with the client's SLA and without affecting user experience.

Figure 6:
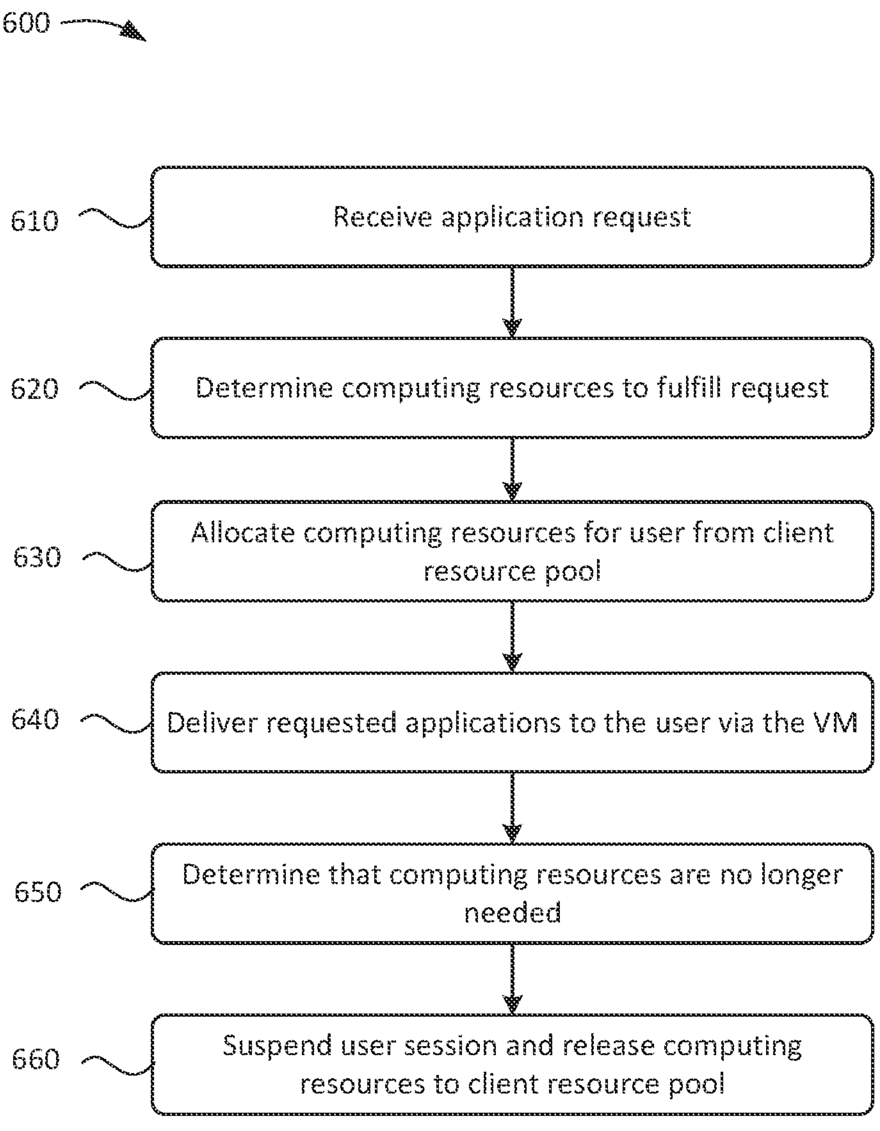
FIG. 6 illustrates an example flowchart of a process for delivering applications to users via VMs on-demand while conserving computing resources.

FIG. 6 illustrates an example flowchart of a process for delivering applications to users via VMs on-demand while conserving computing resources. The blocks of FIG. 6 may be implemented in the environment of FIG. 2, for example, and are described using reference numbers of elements depicted in FIG. 2. As noted herein, the flowchart illustrates the architecture, functionality, and operation of possible implementations of systems, methods, and computer program products according to various embodiments of the present disclosure.

As shown in FIG. 6, the process 600 may include receiving an application request (as at block 610). For example, the application host server 220 may receive an application request from the client device 210 (e.g., via a web-portal, application, an electronic form, etc.). In some embodiments, the application request may include a request to remotely access one or more applications hosted by the application host server 220. In some embodiments, the application request may identify the user, the client associated with the user, one or more applications requested, and/or the locations of the applications (e.g., the custom package repository 420 and/or the global repository 410 as identified from the metadata associated with the requested applications). In some embodiments, the requested applications may be pre-populated in a form based on applications the user has previously requested.

The process 600 also may include determining computing resources (as at block 620). For example, the application host server 220 may determine the level of computing resources needed for fulfilling the application request. In some embodiments, the application host server 220 may analyze the application request and identify computing resources that may be needed to host the applications (e.g., based on the resource demands of the applications). In embodiments, the application host server 220 may identify computing resources further based on the user's historical user activity, user profile, user's job roles, etc. that indicate the resource demands of the user. In some embodiments, the application host server 220 may identify VMs from the resource/VM pool of the client to which the user is associated that satisfy the resources needed to fulfill the application request.

The process 600 further may include allocating computing resources for the user from the client resource pool (as at block 630). For example, the application host server 220 may allocate the determined level of computing resources (e.g., determined at block 620) to the user as part of fulfilling the application request (e.g., received at block 610). More specifically, the application host server 220 may allocate the computing resources by starting and serving a VM and allocating the determined level of resources (or start/server a VM that is pre-configured with the determined level of resources). Additionally, or alternatively, the application host server 220 may allocate additional resources to an existing VM that may be currently in use by a different user such that the existing VM may be used to fulfill the application request and deliver the requested application (e.g., requested at block 610). In such a situation, multiple user sessions may be run on the single VM in which additional resources may be allocated to the VM to support the additional user session.

The process 600 may also include delivering the requested applications to the user via the VM (block 640). For example, the application host server 220 may dynamically deliver the requested applications to the user via the VM. In some embodiments, the application host server 220 may deliver the requested applications by executing the requested applications on the VM and/or providing an icon/link to the VM whereby the application may be executed. As the VM is allocated with the sufficient level of resources to host the requested applications, the performance of the applications is not diminished without the VM consuming excessive computing resources.

The process 600 also may include determining that the computing resources are no longer needed (as at block 650). For example, the application host server 220 may determine that the computing resources are no longer needed (e.g., that the user is no longer using the VM or its applications after a period of inactivity). Additionally, or alternatively, the application host server 220 may determine that fewer computing resources are needed based on user profile and user history information indicating the applications that the user uses at different time periods. For example, the user's profile may identify off-peak times in which the user may run less resource-intensive applications and/or workflows.

The process 600 further may include suspending the user session and releasing the computing resources to the client's resource pool (as at block 660). For example, the application host server 220 may suspend the state of the VM based on determining that the computing resources are no longer needed (e.g., that the user is no longer using the VM or applications hosted by the VM). The application host server 220 may release (e.g., un-allocate) the computing resources to the resource pool associated of the client to which the user is associated. In some embodiments, the application host server 220 may release a portion of the computing resources while continuing to run the VM and session (e.g., when the application host server 220 determines that the user is still using the applications, but at off-peak times in which fewer resources are needed).

The process 600 may provide Just-In-Time routing to a dynamic VM that is available at a given time of an application request in a manner that decouples the user from a specific individual VM, thereby conserving computing resources. Further, the user may be connected to a new VM that will includes the most up-to-date operating system and applications, without the need to individually administer a user-specific VM. As further described herein, when it is detected that the user is not actively using the applications on a VM, the VM can be suspended and then resumed when the user re-requests the applications. Further, for multiple applications and user profiles, it is possible to for multiple users to use a single VM without sacrificing performance.

User do not always utilize the computing resources allocated to a virtual machine, as some applications demand relatively few computing resources. Thus, if low-resource applications are requested by the user, these applications may be instantiated on a cheaper VM (e.g., lower resource-consuming VM with lower resource allocation), and this VM may be served to the user. Similarly, in accordance with process 600, a VM with a higher resource allocation may be served when the user requests more resource-demanding applications.

Figure 7:
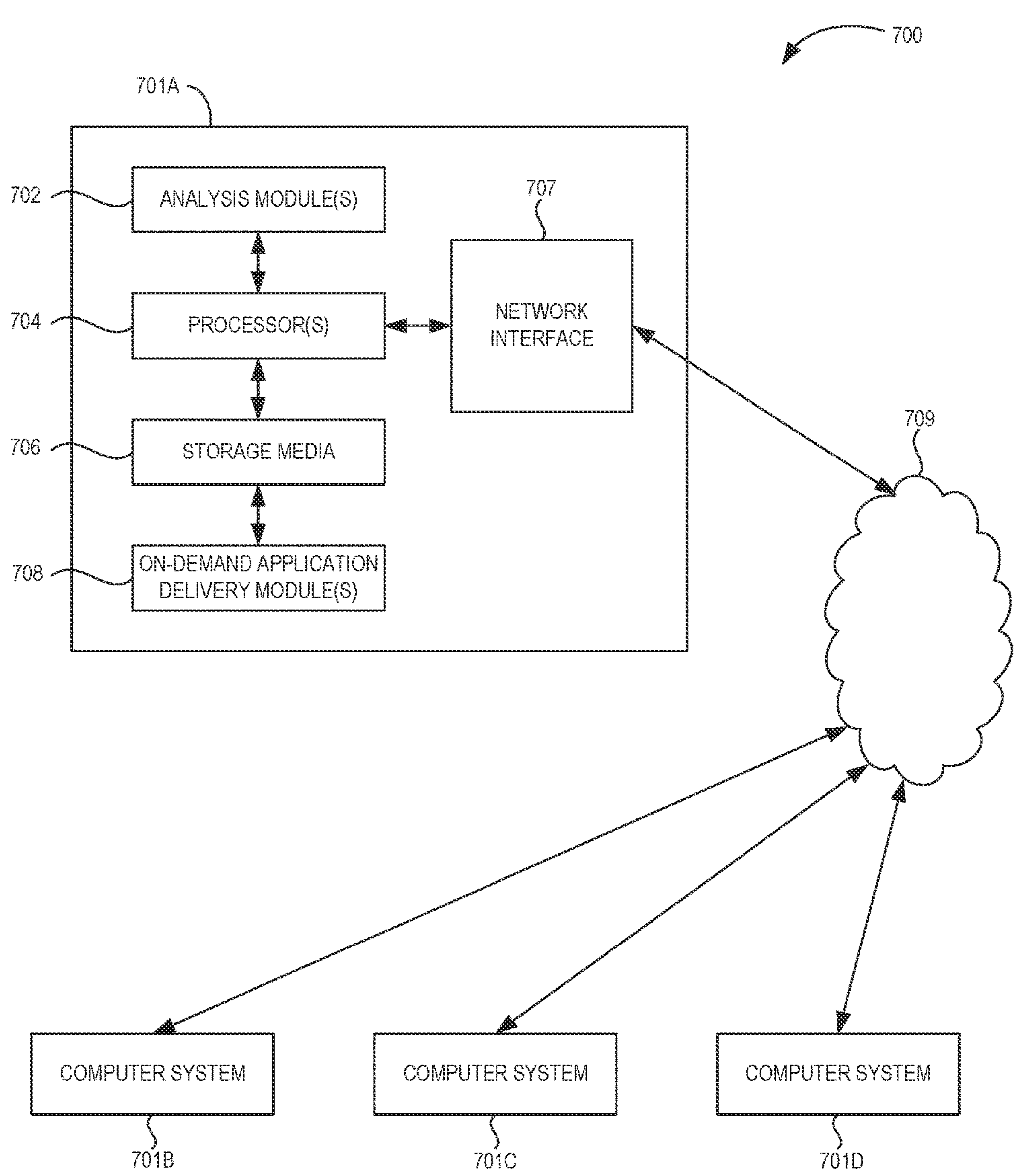
FIG. 7 illustrates a schematic view of a computing system, according to an embodiment.

In some embodiments, the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis modules 702 that are configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor may include a microprocessor, microcontroller, processor module or subsystem, programmable integrated circuit, programmable gate array, or another control or computing device.

The storage media 706 may be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 700 contains one or more on-demand application delivery module(s) 708. In the example of computing system 700, computer system 701A includes the on-demand application delivery module 708. In some embodiments, a single on-demand application delivery module 708 may be used to perform some aspects of one or more embodiments of the methods disclosed herein. In other embodiments, a plurality of on-demand application delivery modules 708 may be used to perform some aspects of methods herein.

It should be appreciated that computing system 700 is merely one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method comprising:

maintaining, via an application host server, a global package repository corresponding to a plurality of clients and one or more custom package repositories, wherein a custom package repository of the one or more custom package repositories corresponds to a client of the plurality of clients;

generating, via the application host server, a client profile corresponding to the client of the plurality of clients based at least in part on a service level agreement (SLA) associated with the client;

generating, via the application host server, a client resource pool comprising one or more virtual machines (VMs) with different levels of computing resources to support different applications based on the client profile and the custom package repository corresponding to the client;

receiving, via the application host server, an application request from a user associated with the client, wherein the application request includes a request to remotely access one or more applications hosted on the custom package repository;

determining, via the application host server, an additional level of computing resources for fulfilling the application request, wherein the additional level of computing resources is determined based on the one or more applications requested;

allocating, via the application host server, the additional level of computing resources from the client resource pool to the user by starting and serving a virtual machine (VM) from the client resource pool with the additional level of the computing resources;

providing, via the application host server, the VM to the user, wherein the one or more applications execute on the VM and are available in the VM through the custom package repository, and wherein the VM is made available to the user for remote access;

dynamically delivering the one or more applications to the user via the application host server executing at least one application of the one or more applications within the VM, wherein the execution of the at least one application of the one or more applications may be remotely initiated via a link, an application icon, or combinations thereof within the VM;

determining, via the application host server, that at least a portion of the additional level of computing resources is no longer in use;

suspending, via the application host server, a state of the VM based on determining the at least the portion of the additional level of computing resources is no longer in use; and deallocating, via the application host server, the at least the portion of the additional level of computing resources from the VM to the client resource pool.

2. The method of claim 1, further comprising dynamically modifying the client resource pool.

3. The method of claim 2, wherein the dynamically modifying the client resource pool comprises increasing or reducing one or more levels of computing resources of the different levels of computing resources allocated to the one or more VMs of the client resource pool based at least in part on the client profile, a client usage activity, a client usage history, or a combination thereof, at different time periods.

4. The method of claim 1, wherein the one or more applications are non-cloud native applications.

5. The method of claim 1, wherein the suspending the state of the VM comprises saving a state of the VM served to the user or shutting down the VM.

6. The method of claim 1, wherein the allocating the additional level of computing resources further comprises allocating the additional level of computing resources to an existing VM that is currently running.

7. The method of claim 1, further comprising:

monitoring, via the application host server, a client usage activity based at least in part on the additional level of computing resources for fulfilling the application request and a period of time between the delivering the one or more applications to the user and the determining that the at least a portion of the additional level of computing resources is no longer in use; and updating the client profile based on the client usage activity.

8. The method of claim 1, comprising:

receiving an additional application request from a second user, wherein the additional application request includes a second request for the second user to remotely access the one or more applications hosted on the custom package repository;

determining a second additional level of computing resources for fulfilling the additional application request;

allocating the second additional level of computing resources from the client resource pool to the VM via the application host server;

providing the VM to the second user through the application host server, wherein the one or more applications execute on the VM and are available in the VM through the custom package repository, and wherein the VM is made available to the second user for remote access; and delivering the one or more applications to the second user via the application host server executing the at least one application of the one or more applications within the VM, wherein the one or more applications are delivered to the user via the VM in a first user session and the one or more applications are delivered to the second user via the VM in a second user session.

9. A computing system, comprising:

one or more processors; and a memory system comprising one or more non-transitory computer-readable media storing instructions that, when executed by at least one of the one or more processors, cause the computing system to perform operations, the operations comprising:

maintaining a global package repository corresponding to a plurality of clients and one or more custom package repositories, wherein a custom package repository of the one or more custom package repositories corresponds to a client of the plurality of clients;

generating a client profile corresponding to the client of the plurality of clients based at least in part on a service level agreement (SLA) associated with the client;

generating a client resource pool comprising one or more virtual machines (VMs) with different levels of computing resources to support different applications based on the client profile and the custom package repository corresponding to the client;

receiving an application request from a user associated with the client, wherein the application request includes a request to remotely access one or more applications hosted on the custom package repository;

determining an additional level of computing resources for fulfilling the application request, wherein the additional level of computing resources is determined based on the one or more applications requested;

allocating the additional level of computing resources from the client resource pool to the user by starting and serving a virtual machine (VM) from the client resource pool with the additional level of computing resources;

providing the VM to the user, wherein the one or more applications execute on the VM and are available in the VM through the custom package repository, and wherein the VM is made available to the user for remote access;

dynamically delivering the one or more applications to the user by executing at least one application of the one or more applications within the VM, wherein the execution of the at least one application of the one or more applications may be remotely initiated via a link, an application icon, or combinations thereof within the VM;

determining that at least a portion of the additional level of the computing resources is no longer in use;

suspending a state of the VM based on determining the at least the portion of the additional level of computing resources is no longer in use; and deallocating the at least the portion of the additional level of computing resources from the VM to the client resource pool.

10. The computing system of claim 9, the operations further comprising dynamically modifying the client resource pool.

11. The computing system of claim 10, wherein the dynamically modifying the client resource pool comprises increasing or reducing one or more levels of computing resources of the different levels of computing resources allocated to the one or more VMs of the client resource pool based at least in part on the client profile, a client usage activity, a client usage history, or a combination thereof, at different time periods.

12. The computing system of claim 9, wherein the one or more applications are non-cloud native applications.

13. The computing system of claim 9, wherein the suspending the state of the VM comprises saving a state of the VM served to the user or shutting down the VM.

14. The computing system of claim 9, wherein the allocating the additional level of computing resources further comprises allocating the additional level of computing resources to an existing VM that is currently running.

15. The computing system of claim 9, wherein the memory system comprises the one or more non-transitory computer-readable media storing the instructions that, when executed by the at least one of the one or more processors, cause the computing system to perform additional operations comprising:

receiving an additional application request from a second user, wherein the additional application request includes a second request for the second user to remotely access the one or more applications hosted on the custom package repository;

determining a second additional level of computing resources for fulfilling the additional application request;

allocating the second additional level of computing resources from the client resource pool to the VM;

providing the VM to the second user, wherein the one or more applications execute on the VM and are available in the VM through the custom package repository, and wherein the VM is made available to the second user for remote access; and delivering the one or more applications to the second user by executing the at least one application of the one or more applications within the VM, wherein the one or more applications are delivered to the user via the VM in a first user session and the one or more applications are delivered to the second user via the VM in a second user session.

16. A non-transitory computer-readable medium storing instructions that, when executed by one or more processors of a computing system, cause the computing system to perform operations, the operations comprising:

maintaining a global package repository corresponding to a plurality of clients and one or more custom package repositories, wherein a custom package repository of the one or more custom package repositories corresponds to a client of the plurality of clients;

generating a client profile corresponding to the client of the plurality of clients based at least in part on a service level agreement (SLA) associated with the client;

generating a client resource pool comprising one or more virtual machines (VMs) with different levels of computing resources to support different applications based on the client profile and the custom package repository corresponding to the client;

receiving an application request from a user associated with the client, wherein the application request includes a request to remotely access one or more applications hosted on the custom package repository;

determining an additional level of computing resources for fulfilling the application request, wherein the additional level of computing resources is determined based on the one or more applications requested;

allocating the additional level of computing resources to the user from the client resource pool by starting and serving a virtual machine (VM) from the client resource pool with the additional level of computing resources;

providing the VM to the user, wherein the one or more applications execute on the VM and are available in the VM through the custom package repository, and wherein the VM is made available to the user for remote access;

dynamically delivering the one or more applications to the user by executing at least one application of the one or more applications within the VM, wherein the execution of the at least one application of the one or more applications may be remotely initiated via a link, an application icon, or combinations thereof within the VM;

determining that at least a portion of the additional level of computing resources is no longer in use;

suspending a state of the VM based on the determining the at least a portion of the additional level of computing resources is no longer in use; and deallocating the at least the portion of the additional level of computing resources to the client resource pool.

17. The non-transitory computer-readable medium of claim 16, the operations further comprising dynamically modifying the client resource pool.

18. The non-transitory computer-readable medium of claim 17, wherein the dynamically modifying the client resource pool comprises increasing or reducing one or more levels of computing resources of the different levels of computing resources allocated to the one or more VMs of the client resource pool based at least in part on the client profile, a client usage activity, a client usage history, or a combination thereof, at different time periods.

19. The non-transitory computer-readable medium of claim 16, wherein the one or more applications are non-cloud native applications.

20. The non-transitory computer-readable medium of claim 16, wherein the suspending the state of the VM comprises saving a state of the VM served to the user or shutting down the VM.

* * * * *